L. GRUBER.
METHOD OF ELECTRIC WELDING.
APPLICATION FILED MAR. 14, 1918.

1,332,394.

Patented Mar. 2, 1920.

Inventor
LOUIS GRUBER
by Carl Beust
Attorney

UNITED STATES PATENT OFFICE.

LOUIS GRUBER, OF DAYTON, OHIO, ASSIGNOR TO THE NATIONAL CASH REGISTER COMPANY, OF DAYTON, OHIO.

METHOD OF ELECTRIC WELDING.

1,332,394. Specification of Letters Patent. Patented Mar. 2, 1920.

Application filed March 14, 1918. Serial No. 222,356.

*To all whom it may concern:*

Be it known that I, LOUIS GRUBER, a citizen of the United States, residing at Dayton, in the county of Montgomery and State of Ohio, have invented certain new and useful Improvements in Methods of Electric Welding, of which I declare the following to be a full, clear, and exact description.

This invention relates to improvements in electric welding and also the new articles produced thereby.

The primary object of the present improvement is to provide a new process of riveting having a novel manner of placing the partial punchings which thus become dowels in position in the recesses or holes provided to receive them, and then passing through said dowels an electric current of sufficient volume to heat the dowels and the adjacent portion of the metal to a temperature requisite to weld the projection and the adjacent portion of the metal into a homogeneous mass.

The improved method herein differs from that disclosed in the patent to Elihu Thompson No. 396,015, dated January 8, 1889. In the said patent mentioned, the rivets are placed in position by hand in the usual and well known manner whereas in the method herein, dowels are formed from and are attached to one of the pieces of metal which are to be secured together. Since the dowels are formed from one of the pieces of metal which are to be secured together, the operation of placing the rivets by hand which is necessary in the said process before mentioned is eliminated.

The formed dowel is projected from the surface of the piece of metal to which it is attached a sufficient distance to project through the other piece of metal which is pierced with an opening to receive it. As a consequence the projected dowel forms a means for locating the two pieces of metal together in position to be welded.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
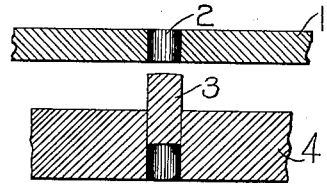
Figure 1 is a fragmentary vertical sectional view illustrating two pieces of metal which are to be secured together, and showing a dowel formed and projected from one piece of metal and an opening pierced in the other piece of metal to receive the said dowel, the piece of metal from which the dowel is projected having a greater thickness than the piece of metal through which the hole is pierced.

Referring now to the drawings in detail in which like reference numerals designate similar parts throughout the several figures, the numeral 1 designates a piece of metal through which a hole 2 is pierced to receive a dowel 3 projected from another piece of metal 4. Attention is directed to the fact that the piece of metal 4 is of a thickness considerably greater than the piece of metal 1. This is for the purpose of permitting sufficient metal to project the dowel 3 a length sufficient to pass through the opening pierced in the piece of metal 1, and project a slight distance beyond the surface thereof.

In most forms of manufacture, the dowel 3 may be projected from the piece of metal 4 by a progressive die at the time the piece of metal 4 is punched to its desired shape.

Although the projection of the dowel 3 by the punch causes a complete fracture between the dowel and the piece of metal from which it is formed so that the projected dowel is no longer integral with or a part of the piece of metal, nevertheless it is held secured to the body portion of the metal by frictional engagement therewith.

Since the projected dowel 3 remains firmly secured to the piece of metal 4 from which it was projected, it forms a means for locating the piece of metal 1 and at the same time dispenses with the necessity of inserting the rivet by hand, as is done in methods of riveting such as is disclosed in the patent to Thompson heretofore mentioned.

Figure 2:
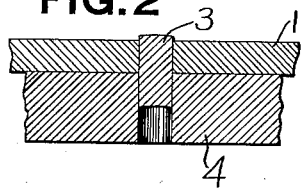
Fig. 2 is a view similar to Fig. 1, showing the two pieces of metal assembled and in position to be welded.

After the dowel has been projected from one piece of metal and a hole pierced in the other piece of metal as is illustrated in Fig. 1 the two pieces of metal are assembled or in other words the two pieces of metal 1 and 4 so arranged in relation to each other that the projected dowel 3 passes through the opening 2. After the assembly of the two pieces of metal 1 and 4 in the position illustrated in Fig. 2 they are ready to be subjected to an electric current for welding them together. The electric current is applied in the usual and well known manner by means of two electrodes arranged on opposite sides of the pieces of metal 1 and 4 at the point where the dowel 3 passes therethrough. Contemporaneously with the passage of the electric current through the dowel and adjacent portion of the two pieces of metal, pressure is applied at opposite sides of the dowel and also the adjacent portion of the two pieces of metal. Any desired type of electrode may be applied against the dowel 3 and the usual pressure exerted thereon for welding. The maximum pressure of any welding machine will not be sufficient to force the projected dowel from its protruding position beyond the surface of the metal 1 since tests have shown that a pressure of 1600 lbs. is required to move the dowel from its projected position and the maximum pressure necessary and provided by welding machines is less than a hundred pounds. After the electrodes have been removed, it will be found that the outer end of the projected dowel 3 which protruded slightly beyond the piece of metal 1 has been flowed out upon the surface of the metal, from which it may be subsequently removed by the usual grinding and burnishing process; that the edges and surface of the pieces of metal 4 have been flowed into the recess left by the projected dowel 3; and that the projected dowel and adjacent portion of the two pieces of metal have been fused together throughout the length of the dowel so as to form a homogeneous or autogeneous mass. Any riveting machine or process may be used for holding the electrodes and applying pressure thereto such as is illustrated in the Thompson patent heretofore mentioned, or such a method employed as is illustrated and described in the patent to Johann Harmatta No. 1,046,066, dated January 3, 1912. The present method herein described differs materially from that disclosed in the Harmatta patent before mentioned for the reason that the present method contemplates the use of dowels for securing the two pieces of metal together, whereas in the Harmatta method no rivets or dowels are required, and it is the particular and essential object of the Harmatta method to dispense with rivets or dowels entirely.

By the improved method herein, all the advantages of the Harmatta method are secured, viz., the elimination of the operation of inserting rivets and at the same time the disadvantages of the Thompson method eliminated, viz., the operation of inserting the rivets. The present method also has the additional advantages not found in either the Harmatta or Thompson method which is the provision of means for locating and holding the two pieces of metal together while they are being welded. This location means, as has been previously described, consists of the projected dowel carried by the piece of metal 4 which projects through the hole made in the piece of metal 1.

Figure 10:
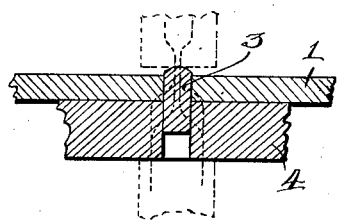
Fig. 10 is a diagrammatic view showing the probable path of the welding current between the electrodes.

While it is not completely understood how the current passes through the parts in effecting the weld in connection with this invention, it is thought that Fig. 10 illustrates the best knowledge in this matter. It will be seen in this figure that the current travels at first through practically a spot in passing from or to one of the electrodes, thereby fusing at once the end of the dowel and completely filling the hole 2 through which it passes and making a perfect union with the plate 1. At the same time an excess of metal from the dowel 3 is flowed about the surface of the plate 1 thus preventing an objectionable pit upon a surface later to be suitably decorated.

In flowing to or from the same electrode the current has little tendency to pass through the plate 1, a matter of great importance when very thin plates are joined to thick ones. In most methods of electric welding the thin plate is commonly seriously burned before the thicker plate has been raised to welding temperature. In this invention the current is passed principally through the thicker plate and thus its tendency to radiate the heat induced is overcome the more readily, at least there is less heating induced in the thin plate than in the thicker one, all to the advantage of the thin plate. There is present another means for keeping the current out of the thin plate, namely the air space around the dowel 3 in the plate 1, this condition probably exists as long as the electrode is in contact with the dowel 3 and until said dowel is fused, at which time the terminal contacts the plate 1. It is thought that by this time the thicker plate has been heated sufficiently in spite of its greater radiating capacity to properly weld with the thinner plate.

Figure 3:
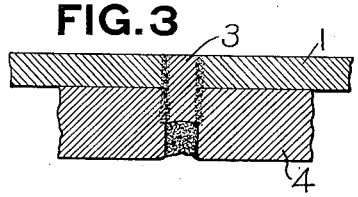
Fig. 3 is a view similar to Fig. 1, showing the pieces of metal after the welding action has taken place, the dowels and adjacent portion of the metal being welded into a homogeneous mass.
Figure 4:
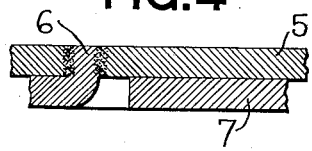
Fig. 4 is a fragmentary vertical sectional view showing the manner of welding two pieces of metal together where both of the pieces of metal have the same thickness, in this instance the projected dowel being in the form of an upwardly turned ear.
Figure 6:
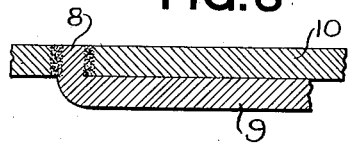
Fig. 6 is a fragmentary vertical sectional view showing the method of attaching two pieces of metal together where both of the said pieces of metal are of the same thickness, the projected dowel in this instance being in the form of an upwardly turned ear formed on the edge of one of the pieces of metal.
Figure 5:
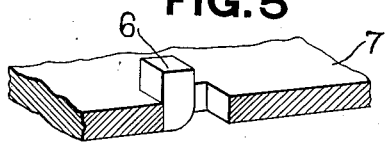
Fig. 5 is a fragmentary perspective view of the piece of metal illustrated in Fig. 4 from which the projected ear is formed.
Figure 7:
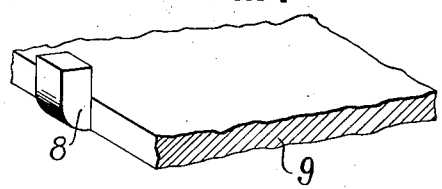
Fig. 7 is a fragmentary perspective view of the piece of metal illustrated in Fig. 6 from which the upwardly turned ear or projected dowel is formed.

The method heretofore described has related more specifically to the securing of the pieces of metal together where one of the pieces of metal has a greater thickness than the other. Where the two pieces of metal to be secured together have the same thickness, the method heretofore described is modified to a certain extent as is illustrated in Figs. 4 to 7 inclusive. When both pieces of metal have the same or approximately the same thickness, or in other words if neither piece of metal has a thickness to provide for the projection of a dowel in the manner illustrated in Figs. 1, 2 and 3, an ear acting as a dowel is projected and struck up from the surface of one of the pieces of metal as is illustrated in Fig. 4. Referring specifically to this figure reference numeral 5 represents one piece of metal through which a hole is pierced similar to the piece of metal 1 and hole 2. Fitting within the hole formed in the piece of metal 5 is an upwardly turned ear 6 which is struck up from the body portion of the piece of metal 7, the upwardly turned ear 6 being of a length sufficient to pass through the hole pierced in the piece of metal 5. Electric current is then passed through the ear 6 and adjacent portion of the pieces of metal 5 and 7 and pressure applied thereto in a similar manner to that previously described so that the projected ear 6 and adjacent pieces of metal 5 and 7 are welded together into a homogeneous mass. Another modified form of method of attaching two pieces of metal where they are of the same thickness is shown in Figs. 6 and 7. In this instance an ear 8 acting as a dowel is turned upwardly from one of the pieces of metal 9, the ear being formed on the edge of the piece of metal 9 instead of being struck up from the body portion thereof as is the ear 6 illustrated in Fig. 4. The ear 8 like the ear 6 is of a length sufficient to pass through a hole pierced in the other piece of metal 10 and likewise acts as a dowel. After the pieces of metal are assembled, electrodes are applied to opposite sides of the ear 8 and also to opposite sides of the two pieces of metal. After the electrodes are thus arranged pressure is applied and an electric current is passed from one electrode through the ear 8 and adjacent portion of the pieces of metal and then into the other electrode thereby welding the said ear 8 and pieces of metal 9 and 10 together so that they form a substantially homogeneous or autogeneous mass.

Figure 8:
Fig. 8 is a fragmentary vertical sectional view showing a modified manner of welding two pieces of metal together where both of the pieces of metal have the same thickness, in this instance each piece of metal being provided with a projected dowel, the projection of one piece, however, being flowed upon the surface of the metal and not performing any function whatever as a dowel.
Figure 8:
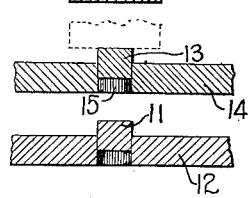
Figure 9:
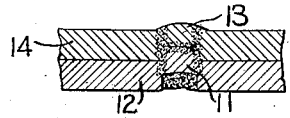
Fig. 9 is a view similar to Fig. 8 showing the two pieces of metal assembled and after the welding action has taken place, this figure illustrating the fusing of the projection of one piece within the recess made in the other and the flowing of the projection of the other piece of metal upon the surface thereof.

Still another modified form or method of attaching two pieces of metal together where they are of the same thickness is shown in Figs. 8 and 9. In this instance, a dowel 11 is projected from one piece of metal 12 and a similar dowel 13 projected from the other piece of metal 14, the projected dowels 11 and 13 protruding from the surfaces of the pieces of metal 12 and 14 respectively a distance equal to approximately one-half the thickness of the said pieces of metal. After the pieces of metal are punched in the manner described the projected dowel 11 is fitted within a recess 15 left in the piece of metal 14 by the projection of the dowel 13. When in this assembled position electrodes are applied in the usual manner, one beneath the projected dowel 11 and the other above the projected dowel 13 and pressure applied to the said electrodes sufficient to form an electrical contact. The current is then passed from one electrode through the projected dowels 11 and 13 and adjacent portions of the two pieces of metal 12 and 14, which will flow the projected dowel 13 upon the surface of the piece of metal 14 and also fuse the adjacent portions of the pieces of metal 12 and 14 and projected dowels 11 and 13 into a homogeneous mass. As before stated the pressure of the electrodes will not disturb the projected dowels 11 and 13, and that in this instance it will be found that like the methods heretofore described after the electrodes have been removed, the projected dowel 13 which protrudes beyond the surface of the piece of metal 14 has been flowed out upon the surface of the metal 13 from which it may be subsequently removed by the usual grinding and burnishing process; that the edges and surface of the piece of metal 12 has been flowed into the recess left by the projected dowel 13; and that the projected dowel 11 and that portion of the projected dowel 13 remaining within the piece of metal 14 together with the adjacent portions of the two pieces of metal 12 and 14 have fused together so as to form a homogeneous or autogeneous mass.

While the steps of the method herein shown and described, are admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. The herein described method of electric riveting which consists in providing a piece of metal with a projection punched therefrom consisting of metal from both surfaces and from the interior thereof and another piece of metal with a recess extending from the surface to the exterior to receive said projection, and then passing through the said projection and adjacent portion of the two pieces of metal an electric current of welding intensity thus uniting said pieces of metal by joining the interior portions thereof.

2. The herein described improved method of uniting two pieces of metal, consisting in providing one of the pieces of metal with a projection extending from the interior of said piece of metal and the other piece of metal with a recess to receive said projection, assembling the pieces by entering the projection in said recess and then passing through the said projection and adjacent portions of the two pieces of metal an electric current of welding intensity thus uniting the pieces by a connection extending from the interior of one to the interior of the other.

3. The herein described improved method of uniting two pieces of metal, consisting in providing one of the pieces of metal with a recess and providing the other piece of metal with a projection of a sufficient length to fit within said recess and then passing through the projection and adjacent portion of the two pieces of metal an electric current of welding intensity thus uniting the projection throughout its longitudinal surface with the interior portion of said pieces of metal.

4. The herein described improved method of electric riveting consisting in providing one of the pieces of metal with a recess and stamping out of the other piece of metal a projection of a length to fit within the said recess and of a diameter to substantially fill said recess and then passing an electric current of welding intensity through the said projection and adjacent portions of the two pieces of metal whereby the welding extends along said projection and from the interior portion of one piece of metal to the interior of the other piece of metal.

5. The improved method of uniting two pieces of metal consisting in stamping out a projection from the body portion of one of the pieces of metal and leaving a recess therein opposite said projection and providing the other piece of metal with a recess to receive said projection and then passing through the said projection and adjacent portion of the two pieces of metal an electric current of welding intensity thus uniting the body portion of both pieces.

6. The herein described improved method of uniting two pieces of metal consisting in stamping a projection from the body portion of one of the pieces of metal so that it projects from the surface thereof and providing the other piece of metal with a hole of substantially the same dimensions as those of said projection to receive said projection so that thereby when pressed into place the parts may remain in assembled relation and then passing through the said projection and adjacent portion of the two pieces of metal an electric current of welding intensity.

7. The herein described improved method of uniting two pieces of metal consisting in stamping one of the pieces of metal so that a dowel is fractured from the body portion thereof but held thereby and projected from the surface of the said metal and providing the other piece of metal with a hole of substantially the size of said dowel to receive said projected dowel and remain in assembled position when pressed into place and then passing through the said plug and adjacent portion of the two pieces of metal an electric current of welding intensity.

8. The herein described improved method of uniting two pieces of metal consisting in providing one of the pieces of the metal with a projection and the other piece of metal with an opening of substantially the diameter of the projection and less than the length thereof to receive said projection then locating the two pieces of metal face to face by fitting the projection within said opening and then passing through the said projection and adjacent portion of the two pieces of metal an electric current of welding intensity.

9. The herein described improved method of uniting two pieces of metal consisting in punching one of the pieces of metal so that a substantially cylindrical punching is projected from the surface thereof in the form of a dowel and providing the other piece of metal with a hole contacting throughout the surface thereof with said dowel to receive said projected rivet and then passing through the said rivet and adjacent portion of the two pieces of metal an electric current of welding intensity.

10. The herein described improved method of uniting two pieces of metal consisting in punching one of the pieces of metal so that a plug is projected from the surface thereof in the form of a dowel, the said plug being fractured from the body portion of the metal but firmly attached thereto by frictional engagement and providing the other piece of metal with a hole of less length than and the same diameter as said dowel to receive the projected rivet and then passing through the said rivet and adjacent portion of the two pieces of metal an electric current of welding intensity thereby fusing the fractured portion of the metal and running the extra length of dowel when fused over the surface of the second plate and avoiding a depression thereby.

11. The herein described improved method of uniting two pieces of metal where one of the pieces of metal has a thickness greater than that of the other consisting in providing the thicker piece of metal with a projection and a recess adjacent thereto and the thinner piece of metal with a hole to receive the projection whereby a continuous member may extend into both pieces of metal and through only one and then passing through the said projection and adjacent portion of the two pieces of metal an electric current of welding intensity.

12. The herein described improved method of uniting two pieces of metal where one of the pieces of metal has a thickness greater than that of the other consisting in providing the thicker piece of metal with a projection of a length equal to the thickness of the thinner piece of metal and providing the thinner piece of metal with an opening to receive said projection and then passing through the said projection and adjacent portion of the two pieces of metal an electric current of welding intensity.

13. The herein described improved method of uniting two pieces of metal where one of the pieces of metal has a thickness greater than that of the other consisting in providing the thicker piece of metal with a projection of a length not less than the thickness of the thinner piece of metal and providing the thinner piece of metal with an opening to receive said projection then fitting the projection into the opening so that the two pieces of metal lie face to face and then passing through the said projection and adjacent portion of the pieces of metal an electric current of welding intensity.

14. Metal plates united by a number of dowels struck from and projected from one plate and rigidly attached thereto and fitting into holes in the other plate of substantially the same diameter and providing a continuous extent of metal uniting both plates and spaced and isolated welds formed at the points where the projected rivets and holes are located.

15. Metal articles comprising two bodies of metal having adjacent plane surfaces one body of metal having a projection fitting into an opening pierced in the other body of metal of substantially the same diameter as said projection thereby retaining the bodies of metal in joined relation when said projections are entered in said holes before final treatment, the said projection and adjacent portions of the two metal bodies having an autogeneous welded union.

16. The herein described improved method of uniting after assembling two pieces of metal consisting in providing one of the pieces of metal with a projection and the other piece of metal with an opening of substantially the same diameter as said projection to receive said projection, then pressing the bodies together to form a preliminary union and then passing an electric current of welding intensity through said projection and forming a permanent union.

17. The herein described improved method of uniting two pieces of metal consisting in providing one of the pieces of metal with a projection and the other piece of metal with an opening to receive said projection of substantially the same diameter as said projection then arranging said pieces of metal face to face the projection of one piece fitting within the opening formed in the other then applying pressure to said projection and adjacent portions of the two pieces of metal to temporarily unite them and later passing an electric current of welding intensity through the said projection and adjacent portions of the two pieces of metal.

18. The herein described improved method of fastening two pieces of metal consisting in fitting the projection formed on one piece of metal into an opening formed in the other piece of metal and then applying pressure and later applying pressure and an electric current of welding intensity localized in the spot where said projection and openings are located.

19. The herein described improved method of manufacture consisting in stamping out pieces of metal to shape, providing one of the pieces of metal with a projection and the other piece of metal with an opening to receive said projection, said projection and said opening being of substantially the same size and then putting the said pieces of metal together with the projection of one piece located within the opening of the other and then applying pressure to temporarily unite said pieces of metal and thereafter applying pressure and passing an electric current of welding intensity through the said projection and hole.

20. The herein described improved method of uniting two pieces of metal consisting in providing one of the pieces of metal with a projection struck out of the body portion thereof but frictionally attached thereto and providing the other piece of metal with an opening to receive said projection; fitting the said pieces of metal together face to face the projection of one piece fitting within the opening formed in the other and then passing an electric current of welding intensity through the said projection and adjacent portions of the two pieces of metal.

21. The herein described method of electric riveting consisting in providing each of two pieces of metal with a projection and a recess of substantially the same transverse size, the recess in one piece of metal arranged to receive the projection of the other therethrough and then passing through the said projections and adjacent portions of the two pieces of metal an electric current of welding intensity.

22. The herein described improved method of uniting two pieces of metal consisting in providing each of the two pieces of metal with a projection and a recess, fitting the projection of one piece of metal within the recess made within the other, thereby joining them temporarily, and then passing through the said projections and adjacent portions of the two pieces of metal an electric current of welding intensity.

23. The herein described improved method of uniting two pieces of metal consisting in providing each of said pieces of metal with a projection and a recess, fitting the projection of one piece of metal within the recess formed in the other, applying slight pressure at opposite sides of said projections and adjacent portions of the two pieces of metal, passing through the said projections and adjacent portions of the two pieces of metal an electric current of welding intensity, and again applying pressure at opposite sides of the said projections and adjacent portions of the two pieces of metal.

24. The herein described method of uniting two pieces of metal consisting in stamping each of the pieces of metal so that a fractured portion thereof projects from the surfaces of the said pieces of metal, the projection of one piece of metal within the recess formed in the other piece of metal and then passing through the said projections and adjacent portions of the two pieces of metal an electric current of welding intensity.

25. The herein described method of uniting two pieces of metal, consisting of perforating one piece, partially punching the other and protruding the punched part of substantially the same diameter as the perforation of the first piece thus leaving an incomplete contact between the punched out portion and the second plate the length of the punched out portion being slightly greater than the thickness of the second plate and leaving a recess in the second plate behind the protruding portion, assembling the plates by pressing the protruding portion into the perforation and then passing through the protruding portion and the plates an electric current of welding intensity by opposed electrodes one of which contacts first with the rounded surface at the end of the punching and later with the plate adjacent thereto while the other electrode contacts the second plate substantially symmetrically about the recess therein, thus directing the current through a point contact at first upon the punched out portion and then through the interrupted contact between the punched out portion and the second plate to the other electrode.

26. The herein described method of electric riveting, which consists in providing one piece of metal with a projecting portion separated therefrom and at the same time intimately contacted throughout the surface in common thereto and to said piece of metal, and another piece of metal having a recess of substantially the same size as the projecting portion of said plate, the passing of an electric current of welding intensity through said projecting portion and said recess, said projection extending through the second plate so as to leave a protuberance of metal when fused along the surface of said second plate after filling the space between the second plate and the projection, said projection also extending sufficiently to maintain one electrode distant from one of the plates to be united and to confine the fusing action to the projection and those parts close thereto in the early stage of the welding operation.

27. The process of welding sheets which comprises perforating one sheet, forming dowels on the other by punching dowels from the other sheet by a movement sufficiently to rupture the metal between the dowel and the sheet but not sufficient to remove the dowel from the sheet, assembling the parts by placing the perforated sheet on the dowels of the other sheet, and welding the dowel to the sides of the perforations of both sheets by electrically heating the joints to a welding temperature.

28. The method of uniting metal parts which consists in perforating one of the parts, forming from the other part plugs of a size to fit the perforations of the other part by rupturing the metal between the body of the sheet and the plug, protruding the ruptured part so as to form a dowel, assembling the pieces by placing the perforated part upon the part provided with the dowels, and electrically welding the dowel to both parts.

29. The method of uniting metal sheets which consists of providing one part with projections formed from the body of the metal by forcing the same from the sheet sufficiently to rupture the metal between the projection and the body of the sheet but not sufficient to entirely remove the same, placing another part having perforations on the projections formed from the first sheet so that the projections on the first sheet serve as dowels to receive lateral stresses, and electrically heating the juncture of the sheets to weld the dowel in position in the two sheets.

30. The method of uniting sheets which consists in perforating one of the sheets, displacing from the other sheet sections of metal of the size of the perforations by rupturing the metal between the sheet and the displaced portion but not removing the sections, placing the perforated sheet upon the displaced portions of the other sheet; and welding the displaced portion to both sheets.

In testimony whereof I affix my signature.

LOUIS GRUBER.